(12) United States Patent
Castellon

(10) Patent No.: US 7,222,418 B2
(45) Date of Patent: May 29, 2007

(54) DEVICE FOR THE ASSEMBLY OF DIRECT ANTIPINCHING SYSTEMS

(76) Inventor: Melchor D. Castellon, Diputacion, 455-457, E-08013 Barcelona (ES)

(*) Notice: Subject to any disclaimer, the term of this patent is extended or adjusted under 35 U.S.C. 154(b) by 0 days.

(21) Appl. No.: 10/476,857

(22) PCT Filed: Jan. 17, 2003

(86) PCT No.: PCT/ES03/00018

§ 371 (c)(1),
(2), (4) Date: Nov. 6, 2003

(87) PCT Pub. No.: WO03/062896

PCT Pub. Date: Jul. 31, 2003

(65) Prior Publication Data

US 2004/0168858 A1    Sep. 2, 2004

(30) Foreign Application Priority Data

Jan. 24, 2002    (ES) .................................. 0200151

(51) Int. Cl.
*B23P 19/00* (2006.01)
*B65H 71/00* (2006.01)
(52) U.S. Cl. ............... 29/819; 254/134.3 R; 254/134.4
(58) Field of Classification Search ................ 29/458, 29/235, 255, 819; 254/134.3 R, 134.4; 184/15.1, 184/15.2; 492/56
See application file for complete search history.

(56) References Cited

U.S. PATENT DOCUMENTS

| | | | | |
|---|---|---|---|---|
| 4,802,270 A | * | 2/1989 | Kashiwaya et al. ........... | 29/241 |
| 5,732,934 A | * | 3/1998 | Sano et al. ............... | 254/134.4 |
| 6,317,543 B1 | * | 11/2001 | Sheu .......................... | 385/114 |
| 6,365,290 B1 | * | 4/2002 | Ghezel-Ayagh et al. ...... | 429/20 |
| 6,402,123 B1 | * | 6/2002 | Rivard .................... | 254/134.4 |
| 6,405,998 B1 | * | 6/2002 | Griffioen ................. | 254/134.4 |
| 6,459,837 B1 | * | 10/2002 | Fitz et al. .................... | 385/113 |
| 6,848,541 B2 | * | 2/2005 | Griffioen et al. ........... | 184/15.2 |
| 6,922,515 B2 | * | 7/2005 | Nechitailo et al. .......... | 385/134 |

FOREIGN PATENT DOCUMENTS

| | | |
|---|---|---|
| DE | 3340972 A1 | 5/1985 |
| EP | 0 410 736 A2 | 1/1991 |
| GB | EP 0410736 A2 * | 7/1990 |
| WO | WO 00/50947 | 8/2000 |

* cited by examiner

*Primary Examiner*—Jermie E. Cozart
(74) *Attorney, Agent, or Firm*—Dickstein, Shapiro, LLP.

(57) ABSTRACT

These systems comprise sensors formed of an optical fiber conductor (4) fitted inside a sheath (8). The device comprises a support (1) provided with cylindrical revolving rollers (2, 3) made of a soft material which rotate in reverse direction to each other and between which an optical fiber conductor (4) is moved; and a supporting device (7) of the sheath (8) which makes it to be in line with the optical fiber conductor (4) so that it is inserted inside the sheath (8) as it is moved by the rollers (2, 3). It is provided with oil supply means (10) toward the optical fiber (4) to facilitate insertion thereof inside the sheath (8).

7 Claims, 1 Drawing Sheet

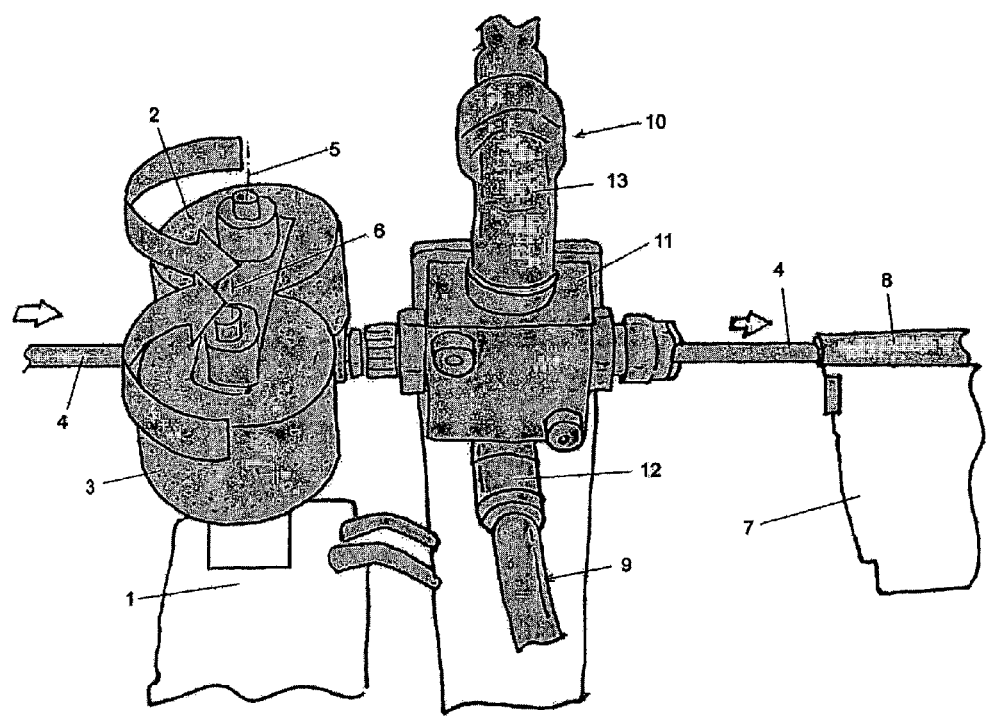

DEVICE FOR THE ASSEMBLY OF DIRECT ANTIPINCHING SYSTEMS

FIELD OF THE INVENTION

The present patent application relates, as stated in its title, to a "DEVICE FOR THE ASSEMBLY OF DIRECT ANTI-PINCHING SYSTEMS" which novel manufacturing, conformation and design features fulfil the purpose to which it has been specifically conceived, with a maximum safety and effectiveness.

BACKGROUND OF THE INVENTION

More specifically, the invention refers to a device for the assembly of direct anti-pinching systems, these systems being of the type which are based on the modification of the light conductivity of an optical fiber in power window devices for motor vehicles. These systems allow modifying the operation of the motor of the power window device, stopping it or reversing their direction of rotation, when any obstacle has been detected during the movement of the window pane.

In this sense, the applicant is the holder of the patent of invention n° P9800393 which shows a direct anti-pinching system comprising a sensor formed by an optical fiber conductor fitted therein, either in a continuous or discontinuous way, inside a sheath running along the entire length of the doorframe perimeter.

In the patent n° P9801717, also filed in the name of the applicant, the optical fiber conductor is fitted inside a prismatic profile forming loops passing through incisions evenly formed in a lateral portion of the profile. These incisions are provided with an inlet for the entrance of the optical fiber through a hole ending in a recess where the conductor is retained by any appropriate fastening means.

In the patent n° P9901533 of the same holder there is envisaged provision of braided optical fiber in helical form outside of the sheath profile.

In the patent n° P200000208 also filed in the name of the same holder, the optical fiber conductor is partially covered by a sheath of elastic or semi-rigid nature that provides room with no protection having holes so that the conductor may be extended therethrough.

In practice, these systems have shown an extreme effectiveness over other blocking detection means which is combined with a very simple structure. However, the main problem of these anti-pinching systems is that the assembly operations have to be manually performed. Assembling the parts which define the anti-pinching system, especially what is referred to the assembly of the optical fiber inside of the sheath, entails time-consuming and consequently capital intensive productive processes.

BRIEF SUMMARY OF THE INVENTION

The invention provides a device for the assembly of direct anti-pinching systems as herein disclosed, that is to say, those being formed by sensors comprising an optical fiber conductor fitted inside a sheath.

The main feature of the device that is herein described is that it comprises supporting means having cylindrical rollers made of soft material, e.g. foam, so that the optical fiber is not damaged, or any other suitable materials whose hardness is smaller than that hardness of the optical fiber sheath. The rollers rotate in opposite direction to each other and they are assembled in respective vertical axes arranged spaced apart to one another a suitable distance therebetween so that said optical fiber may be moved. The device of the present invention also includes a device for supporting said sheath disposed so that said optical fiber conductor is introduced inside the sheath as it is moved by the rollers.

Preferably, the device comprises air pressure supply means toward the interior of the sheath to expand its interior and thus to facilitate insertion of the optical fiber.

In an alternative embodiment of the device of the present invention, it comprises oil supply means toward the optical fiber to still further facilitate insertion thereof inside the sheath. This oil supply means toward the optical fiber are able to deliver sprayed oil so that it is mixed with the air pressure that is being introduced into the sheath.

Advantageously, one of said rollers is rotated by rotating means, the other roller being driven by the first one.

The rollers urge an, already cut length of optical fiber and they make it pass through a block of the device where outlets of air pressure and oil are connected. The sheath, which is held in a position aligned with the optical fiber conductor, receives the mixture of air pressure and oil. The air pressure is blown into the sheath and not in a reverse direction as it is the path with less resistance. This flow of air pressure causes a slight increase in the sheath diameter which eases insertion of the optical fiber inside the tubular structure thereof, especially in the case said sheath is not completely straight. The oil reduces friction between the sensor and the sheath.

Productivity and efficiency in the assembly process of direct anti-pinching systems with a device as described are very high. The speed for pushing the fiber toward the sheath ranges from 0.25 to 1 m/s and the estimated time for the preparation of the components ranges from 10 to 15 seconds, which is a substantial advantage over the manual assembly processes which have been used until recently.

A preferred embodiment of a device for the assembly of direct anti-pinching systems is described hereinbelow in a detailed way and by way of a non limitative example according to the present invention, from which features and advantages thereof will be clearer. The description that follows is given with reference to the accompanying drawing that corresponds to a perspective view of the embodiment of the device of the invention.

BRIEF DESCRIPTION OF THE DRAWINGS

A detailed list of the various parts cited in the present patent application is given below:

(1) support;
(2) driving roller;
(3) driven roller;
(4) optical fiber conductor;
(5) vertical axis of the driving roller;
(6) vertical axis of the driven roller;
(7) supporting device for the optical fiber conductor sheath;
(8) optical fiber conductor sheath;
(9) pressure air supply means;
(10) oil supply means;
(11) block of the device where the outlets of pressure air and oil are connected; and
(12, 13) outlets of pressure air and oil;

DETAILED DESCRIPTION OF THE INVENTION

The device that is herein described is designed for the automatic assembly of an optical fiber in direct anti-pinching systems. As it has been previously described, these systems include a sensor comprising an optical fiber conductor, which may change operation of power window device motor of the vehicle based on the detection of a variation in the light conductivity inside of it, stopping or reversing the direction of rotation of the electric motor that drives the window pane. This happens when an obstacle is found during the movement of the window pane of the motor vehicle or when its operation is abnormal.

The device of the embodiment that is herein described comprises essentially a support (1) provided with cylindrical revolving rollers (2, 3). These rollers (2, 3) are made of foam so that the optical fiber (4) is not damaged. The rollers (2, 3) rotate in reverse direction to each other and they are mounted to respective vertical axes (5, 6) spaced apart to one another a suitable distance so that the optical fiber conductor (4) of the anti-pinching system may be moved therebetween. One of said rollers (2) is rotated by rotating means (not shown), whilst the other roller (3) is driven by the first one.

The device of the invention also includes a supporting device (7) for the sheath (8) of the optical fiber conductor (4). The sheath (8) comprises a hollow rubber tube. The supporting device (7) is assembled so that said optical fiber conductor (4) is inserted inside the sheath (8) as it is moved by the rollers (2, 3) as it has been denoted by the arrows shown in the figure.

Between the rollers (2, 3) and the supporting device (7) there are provided air pressure supply means (9) toward the interior of the sheath (8). The air pressure performs the function of expanding the interior of the sheath (8) and thus easing insertion of the optical fiber (4).

In the embodiment that is herein depicted there are also provided oil supply means (10) toward the optical fiber (4) to facilitate insertion thereof inside the sheath (8) and cooperating with said air pressure supply means (9). Such oil supply means (10) toward the optic fiber (4) are able to deliver sprayed oil so that it is mixed with the air pressure that is being introduced into the sheath (8).

The rollers (2, 3) rotate in contact with the external surface of the optical fiber (4) causing it to be moved horizontally toward the sheath (8) at a speed ranging from 0.25 to 1 m/s, passing through a block (11) of the device where outlets (12, 13) of air pressure and oil are connected. The sheath (8) that is held in a position aligned with the optical fiber (4), as seen in the figure, receives the mixture of air pressure and oil. The air pressure is introduced inside the sheath (8) and not in a reverse direction as it is the path with less resistance.

Once having been sufficiently described what the present patent application consists in accordance to the enclosed drawing, it is understood that any detail modification can be introduced as appropriate, provided that variations may alter the essence of the invention as summarised in the appended claims.

The invention claimed is:

1. Device for the assembly of direct anti-pinching systems comprising a support (1) provided with cylindrical revolving rollers (2, 3) made of a material which is softer than a sheath (8) and which rotate in reverse direction to each other and between which an optical fiber conductor (4) is moved and being in line with the sheath (8) so that the conductor is inserted within said sheath (8) as the conductor is moved by the rollers (2, 3), characterized in that the sheath is of elastic or semi-elastic material, the device further comprises an oil supply (10) disposed outside the sheath and adapted to supply oil to the optical fiber (4) to facilitate insertion thereof inside the sheath (8) and a gas supply disposed outside the sheath and adapted so as to supply gas to the optical fiber (4) in such a way as to facilitate insertion thereof inside the sheath (8) by expanding the sheath.

2. Device for the assembly of direct anti-pinching systems as claimed in claim 1, characterized in that said oil supply (10) is adapted to deliver sprayed oil.

3. Device for the assembly of direct anti-pinching systems as claimed in claim 1, characterized in that said rollers (2, 3) are made of foam.

4. Device for the assembly of direct anti-pinching systems as claimed in claim 2, characterized in that said rollers (2, 3) are made of foam.

5. Device for the assembly of direct anti-pinching systems as claimed in claim 1, characterized in that the gas supply is a supply of pressurized air.

6. Device for the assembly of direct anti-pinching systems as claimed in claim 5, characterized in that the oil supply and gas supply are disposed between the rollers (2,3) and the sheath (8).

7. Device for the assembly of direct anti-pinching systems as claimed in claim 6, characterized in that the oil supply and gas supply are disposed to supply oil and gas such that they mix in an area through which the optical fiber traverses.

* * * * *